US010871080B2

(12) United States Patent
Tsunekawa et al.

(10) Patent No.: US 10,871,080 B2
(45) Date of Patent: Dec. 22, 2020

(54) STEAM TURBINE VALVE DRIVE APPARATUS

(71) Applicants: KABUSHIKI KAISHA TOSHIBA, Minato-ku (JP); Toshiba Energy Systems & Solutions Corporation, Kawasaki (JP)

(72) Inventors: Takuhiro Tsunekawa, Yokohama (JP); Yuichi Nakamura, Yokohama (JP); Koichi Nagaishi, Yokohama (JP); Toshihiko Endo, Yokohama (JP); Hisashi Goto, Kawasaki (JP)

(73) Assignees: KABUSHIKI KAISHA TOSHIBA, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 15/862,160

(22) Filed: Jan. 4, 2018

(65) Prior Publication Data

US 2018/0216485 A1   Aug. 2, 2018

(30) Foreign Application Priority Data

Jan. 31, 2017 (JP) .................................. 2017-015467

(51) Int. Cl.
*F01D 17/14* (2006.01)
*F15B 20/00* (2006.01)
(Continued)

(52) U.S. Cl.
CPC ........... *F01D 17/145* (2013.01); *F01D 25/20* (2013.01); *F15B 1/022* (2013.01); *F15B 20/00* (2013.01);
(Continued)

(58) Field of Classification Search
CPC ...... F01D 17/10; F01D 17/141; F01D 17/143; F01D 17/145; F01D 17/22; F01D 17/24;
(Continued)

(56) References Cited

U.S. PATENT DOCUMENTS 3,551,066 A     12/1970   Sakamoto et al.
3,818,801 A  *   6/1974   Kime ................... B29C 45/6771
                                                       91/519
(Continued)

FOREIGN PATENT DOCUMENTS

CN         102454433 A      5/2012
CN         102656372 A      9/2012
(Continued)

*Primary Examiner* — Robert K Arundale
*Assistant Examiner* — Richard K. Durden
(74) *Attorney, Agent, or Firm* — Oblon, McClelland, Maier & Neustadt, L.L.P.

(57) ABSTRACT

A steam turbine valve drive apparatus in an embodiment includes a piston, a cylinder, a bidirectional pump, a servo motor, and a quick closing mechanism. The cylinder houses the piston in an inner space thereof, the inner space being partitioned by the piston into a first hydraulic chamber and a second hydraulic chamber. The quick closing mechanism executes a quick closing operation of closing the steam valve unit more quickly than the closing operation. Here, the quick closing mechanism executes the quick closing operation by feeding the working oil accumulated in an accumulator to the second hydraulic chamber and draining the working oil from the first hydraulic chamber.

14 Claims, 8 Drawing Sheets

(51) Int. Cl.
 F15B 1/02 (2006.01)
 F16K 31/122 (2006.01)
 F01D 25/20 (2006.01)
 F01K 7/16 (2006.01)
 F16N 23/00 (2006.01)
 F16N 13/06 (2006.01)
(52) U.S. Cl.
 CPC .............. *F16K 31/122* (2013.01); *F01K 7/16* (2013.01); *F05D 2220/31* (2013.01); *F05D 2260/98* (2013.01); *F15B 2211/205* (2013.01); *F15B 2211/20515* (2013.01); *F15B 2211/20561* (2013.01); *F15B 2211/212* (2013.01); *F15B 2211/27* (2013.01); *F15B 2211/61* (2013.01); *F15B 2211/625* (2013.01); *F15B 2211/7054* (2013.01); *F15B 2211/8755* (2013.01); *F15B 2211/88* (2013.01); *F16N 23/00* (2013.01); *F16N 2013/063* (2013.01); *F16N 2210/02* (2013.01); *F16N 2280/02* (2013.01)
(58) Field of Classification Search
 CPC ........ F01D 17/26; F01D 21/18; F16K 31/122; F16K 31/124; F16K 13/1245; F16N 23/00
 See application file for complete search history.

(56) References Cited

U.S. PATENT DOCUMENTS

| | | | | |
|---|---|---|---|---|
| 4,337,620 A | * | 7/1982 | Johnson | B62D 5/07 137/101 |
| 4,585,205 A | * | 4/1986 | Coppola | F01D 21/18 251/26 |
| 4,969,562 A | * | 11/1990 | Saotome | B66C 13/066 212/238 |
| 5,295,783 A | | 3/1994 | Lesko et al. | |
| 2007/0071591 A1 | * | 3/2007 | Shindo | F01D 17/22 415/41 |
| 2011/0142640 A1 | * | 6/2011 | Kamata | F01D 17/26 416/117 |
| 2012/0091373 A1 | * | 4/2012 | Shindo | F01D 17/145 251/12 |
| 2012/0240566 A1 | * | 9/2012 | Ohtsuka | E02F 9/2095 60/413 |
| 2013/0074487 A1 | * | 3/2013 | Herold | F15B 7/006 60/455 |
| 2014/0373710 A1 | * | 12/2014 | Schwacke | F15B 15/1409 92/82 |
| 2017/0011512 A1 | | 1/2017 | Matsubara | |
| 2018/0172177 A1 | * | 6/2018 | Goll | F04B 39/08 |

FOREIGN PATENT DOCUMENTS

| | | |
|---|---|---|
| JP | S59 185401 U | 12/1984 |
| JP | 8-170503 | 7/1996 |
| JP | 2005-307865 A | 11/2005 |
| JP | 2011-102608 A | 5/2011 |
| JP | 2012-082795 A | 4/2012 |
| JP | 2012-102855 | 5/2012 |
| JP | 2015-190837 | 11/2015 |
| JP | 2016-48760 | 4/2016 |

* cited by examiner

STEAM TURBINE VALVE DRIVE APPARATUS

CROSS REFERENCE TO RELATED APPLICATION

This application is based upon and claims the benefit of priority from Japanese Patent Application No. 2017-015467, filed on Jan. 31, 2017; the entire contents of which are incorporated herein by reference.

FIELD

Embodiments described herein generally relate to a steam turbine valve drive apparatus.

BACKGROUND

Generally, in a steam turbine generating station, a steam turbine valve drive apparatus controls the opening degree of a steam valve to thereby control the inflow rate of the steam flowing into the steam turbine in order to adjust the rotation number and the output of the steam turbine.

The steam turbine valve drive apparatus includes a hydraulic system through which a working oil flows and performs feed or drainage of the working oil. Thus, in the steam turbine valve drive apparatus, a piston housed inside a cylinder is driven to control the operation of the steam valve.

When an abnormality occurs in the steam turbine generating station, a quick closing operation of quickly closing the steam valve is performed to block a steam flow passage through which the steam flows to the steam turbine to stop the steam turbine in order to protect devices constituting the steam turbine generating station.

As the steam turbine valve drive apparatus, there is proposed, for example, one that controls the opening degree of the steam valve by installing a bidirectional pump between an upper oil chamber and a lower oil chamber of the cylinder and controlling the rotation number of the bidirectional pump by a servo motor. In this case, the quick closing operation of the steam valve is performed, for example, by utilizing a spring force of a self-closing spring. Therefore, when performing an operation of opening the steam valve, the servo motor needs to have torque overcoming both of the steam power of the steam flowing through the steam valve and the spring force of the self-closing spring. As a result, the capacity of the servo motor increases.

Because of the above circumstances, the steam turbine valve drive apparatus may be difficult to achieve a reduction in size and in power consumption.

Accordingly, an object to be solved by the present invention is to provide a steam turbine valve drive apparatus capable of easily achieving a reduction in size and in power consumption.

DETAILED DESCRIPTION

A steam turbine valve drive apparatus in an embodiment includes a piston, a cylinder, a bidirectional pump, a servo motor, and a quick closing mechanism. The piston is provided at an operation rod that operates a steam valve unit installed in a flow passage for steam flowing to a steam turbine. The cylinder houses the piston in an inner space thereof, the inner space being partitioned by the piston into a first hydraulic chamber and a second hydraulic chamber. The bidirectional pump executes an opening operation of the steam valve unit by feeding a working oil to the first hydraulic chamber and executes a closing operation of the steam valve unit by feeding the working oil to the second hydraulic chamber. The servo motor drives the bidirectional pump. The quick closing mechanism executes a quick closing operation of closing the steam valve unit more quickly than the closing operation. Here, the quick closing mechanism executes the quick closing operation by feeding the working oil accumulated in an accumulator to the second hydraulic chamber and draining the working oil from the first hydraulic chamber.

First Embodiment

Figure 1:
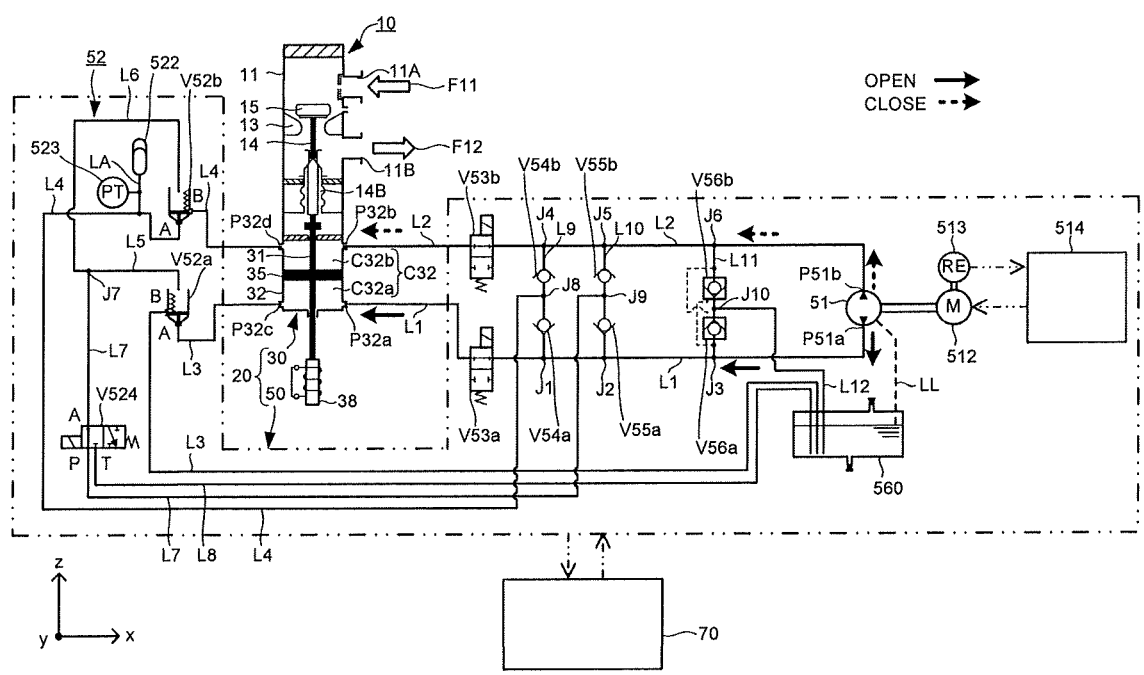
FIG. 1 is a diagram schematically illustrating essential parts of a steam valve unit and a steam turbine valve drive apparatus in a steam turbine generating station according to a first embodiment.

Essential parts of a steam valve unit 10 and a steam turbine valve drive apparatus 20 constituting a steam turbine generating station in this embodiment will be described using FIG. 1. In FIG. 1, regarding a part of the steam valve unit 10, a cross-section in a vertical plane (xz plane) along a vertical direction z is illustrated. FIG. 1 illustrates an appearance in the case where the steam turbine valve drive apparatus 20 performs normal opening and closing operations of the steam valve unit 10. Here, the appearance of a working oil when performing a normal opening operation is indicated also with thick solid arrows, and the appearance of the working oil when performing a normal closing operation is indicated also with thick broken arrows.

As illustrated in FIG. 1, the steam turbine generating station in this embodiment is configured such that the steam valve unit 10 is driven by the steam turbine valve drive apparatus 20 to control the flow of steam to be fed as a working medium from a boiler (not illustrated) to a steam turbine (not illustrated). Details of the units will be described in sequence.

The steam valve unit 10 is a steam valve main body, and varies in opening degree between a valve seat 13 and a valve element 15 inside a valve box unit 11 by a valve rod 14 moved by the steam turbine valve drive apparatus 20 as illustrated in FIG. 1. The steam valve unit 10 is installed in a flow passage for steam flowing to the steam turbine and controlled in opening degree for controlling the steam flow rate, for example, at activation of the steam turbine.

The valve box unit 11 of the steam valve unit 10 is formed with a steam inlet 11A through which steam F11 flows to the inside thereof and a steam outlet 11B through which steam F12 flows to the outside thereof. The valve seat 13 is fixed to the inside of the valve box unit 11. The valve seat 13 includes a portion with which the valve element 15 comes into contact when the steam valve unit 10 is closed.

The valve rod 14 is a rod-shaped body and installed to penetrate through a through hole formed in a lower portion of the valve box unit 11. In the through hole in the valve box unit 11, a tubular bush 14B is installed, and the valve rod 14 penetrates through the though hole in the valve box unit 11 via the bush 14B. The valve rod 14 has an axis along the vertical direction z and is provided to move in the vertical direction z along which the axis exists.

The valve element 15 is housed in the valve box unit 11. The valve element 15 is coupled to one end (upper end in FIG. 1) of the valve rod 14 and moves in the vertical direction z together with the valve rod 14. When the steam valve unit 10 is opened, the valve element 15 moves upward (in a first direction) to separate from the valve seat 13. In contrast, when the steam valve unit 10 is closed, the valve element 15 moves downward (in a second direction). Then, the valve element 15 comes into contact with the valve seat 13 to bring the steam valve unit 10 into an entirely closed state.

The steam turbine valve drive apparatus 20 is installed to operate the steam valve unit 10. In the steam turbine valve drive apparatus 20, a hydraulic pressure drive unit 30 is driven by a hydraulic pressure circuit unit 50 to operate the steam valve unit 10. In the steam turbine valve drive apparatus 20, the operation of the hydraulic pressure circuit unit 50 is controlled by a control device 70 to control the operation of the hydraulic pressure drive unit 30.

In the steam turbine valve drive apparatus 20, the hydraulic pressure drive unit 30 is a hydraulic pressure drive device and installed below the steam valve unit 10 in the vertical direction z as illustrated in FIG. 1. In the hydraulic pressure drive unit 30, a piston 35 is provided at an operation rod 31 that operates the steam valve unit 10, and the piston 35 is housed in a cylinder 32. The hydraulic pressure drive unit 30 is configured such that the piston 35 is driven by the action of the working oil inside the cylinder 32 to cause the operation rod 31 to operate the steam valve unit 10.

The operation rod 31 of the hydraulic pressure drive unit 30 is a rod-shaped body and has an axis along the vertical direction z. The operation rod 31 is coaxial with the axis of the valve rod 14 and has one end (upper end) coupled to the valve rod 14. The operation rod 31 has an opening degree detector 38 provided at the other end (lower end). The operation rod 31 is provided, at its central portion, with the piston 35.

The cylinder 32 of the hydraulic pressure drive unit 30 houses the piston 35 in an inner space C32 thereof. The inner space C32 of the cylinder 32 is partitioned by the piston 35 into a first hydraulic chamber C32a and a second hydraulic chamber C32b. The cylinder 32 is further formed with a first working oil port P32a, a second working oil port P32b, a third working oil port P32c, and a fourth working oil port P32d.

The first hydraulic chamber C32a is a lower hydraulic chamber and located below the piston 35 in the inner space C32 of the cylinder 32. The first hydraulic chamber C32a is provided with the first working oil port P32a and the third working oil port P32c. The first working oil port P32a is connected with an oil passage L1 (first opening degree controlling oil passage), and the third working oil port P32c is connected with an oil passage L3 (first quick closing oil passage).

The second hydraulic chamber C32b is an upper hydraulic chamber and located above the piston 35 in the inner space C32 of the cylinder 32. The second hydraulic chamber C32b is provided with the second working oil port P32b and the fourth working oil port P32d. The second working oil port P32b is connected with an oil passage L2 (second opening degree controlling oil passage), and the fourth working oil port P32d is connected with an oil passage L4 (second quick closing oil passage).

The piston 35 of the hydraulic pressure drive unit 30 is configured to slide in the vertical direction z by the action of the working oil in the inner space C32 of the cylinder 32. More specifically, in the case of opening the steam valve unit 10, the piston 35 is controlled by the hydraulic pressure circuit unit 50 to move upward in the vertical direction z under the influence of steam power acting on the steam valve unit 10. In this case, in the hydraulic pressure circuit unit 50, the working oil is fed to the first hydraulic chamber C32a and the working oil is drained from the second hydraulic chamber C32b to cause the piston 35 to move upward. In the case of closing the steam valve unit 10, the piston 35 is controlled by the hydraulic pressure circuit unit 50 to move downward in the vertical direction z under the influence of steam power acting on the steam valve unit 10. In this case, in the hydraulic pressure circuit unit 50, the working oil is fed to the second hydraulic chamber C32b and the working oil is drained from the first hydraulic chamber C32a to cause the piston 35 to move downward. Besides, in the case of keeping the opening degree of the steam valve unit 10, the pressure in the first hydraulic chamber C32a and the pressure in the second hydraulic chamber C32b are adjusted to bring the piston 35 into a state of being stopped at the same position in the vertical direction z under the influence of steam power acting on the steam valve unit 10.

In the steam turbine valve drive apparatus 20, the hydraulic pressure circuit unit 50 is connected with units constituting the hydraulic pressure circuit unit 50 via a plurality of oil passages L1 to L12. Although details will be described later, the hydraulic pressure circuit unit 50 is configured to perform normal opening and closing operations of the steam valve unit 10 using a bidirectional pump 51, a servo motor 512, a resolver 513, and a servo driver 514. Further, the hydraulic pressure circuit unit 50 is configured to perform a quick closing operation of the steam valve unit 10 using a quick closing mechanism 52 composed of a first dump valve V52a, a second dump valve V52b, and a quick closing electromagnetic valve V524.

The bidirectional pump 51 of the hydraulic pressure circuit unit 50 is configured to execute a normal opening operation of the steam valve unit 10 by feeding the working oil to the first hydraulic chamber C32a, and to execute a normal closing operation of the steam valve unit 10 by feeding the working oil to the second hydraulic chamber C32b.

More specifically, the bidirectional pump 51 has a first pump port P51a and a second pump port P51b, and is configured to discharge the working oil at each of the first pump port P51a and the second pump port P51b. The first pump port P51a of the bidirectional pump 51 is connected to the first working oil port P32a of the cylinder 32 via the first oil passage L1. In contrast, the second pump port P51b of the bidirectional pump 51 is connected to the second working oil port P32b of the cylinder 32 via the second oil passage L2. The bidirectional pump 51 is, for example, a reversible pump, and discharges the working oil from the first pump port P51a or the second pump port P51b by rotation of its drive shaft in a forward direction or a backward direction. The bidirectional pump 51 discharges the working oil from the first pump port P51a to thereby feed the working oil to the first hydraulic chamber C32a via the oil passage L1, and discharges the working oil from the second pump port P51b to thereby feed the working oil to the second hydraulic chamber C32b via the oil passage L2. In addition to the above, the bidirectional pump 51 is configured to cause the working oil leaked at the bidirectional pump 51 to flow out to a reservoir 560 via a leak line LL.

The servo motor 512 of the hydraulic pressure circuit unit 50 has a drive shaft coupled to the bidirectional pump 51. The servo motor 512 changes the rotation direction of the drive shaft to thereby change the direction in which the bidirectional pump 51 discharges the working oil. In addition, the servo motor 512 is configured to change the rotation speed of the drive shaft to thereby vary the amount of the working oil discharged from the bidirectional pump 51.

The resolver 513 of the hydraulic pressure circuit unit 50 is a rotation speed detector and outputs, as a detection signal, data obtained by detecting the rotation number of the servo motor 512.

The servo driver 514 of the hydraulic pressure circuit unit 50 receives actual rotation number data as the detection signal inputted from the resolver 513. In addition, the servo driver 514 receives a rotation number command as a control signal inputted from the control device 70. The servo driver 514 drives the servo motor 512, based on the actual rotation number data inputted from the resolver 513 and the rotation number command inputted from the control device 70. Here, the servo driver 514 controls the operation of the servo motor 512 so that the rotation number of the servo motor 512 becomes the rotation number corresponding to the rotation number command. In other words, in the steam valve unit 10, a feedback control is performed so that a preset required opening degree and the opening degree of the steam valve unit 10 detected by the opening degree detector 38 match with each other.

The oil passage L1 (first opening degree controlling oil passage) in the hydraulic pressure circuit unit 50 has one end (right end) connected to the first pump port P51a of the bidirectional pump 51 and the other end (left end) connected to the first working oil port P32a of the cylinder 32. The oil passage L1 is provided with a branch part J1, a branch part J2, and a branch part J3 in sequence from the cylinder 32 side toward the bidirectional pump 51 side. Further, in the oil passage L1, a first blocking electromagnetic valve V53a is arranged between the cylinder 32 and the branch part J1.

The first blocking electromagnetic valve V53a operates based on the control signal outputted from the control device 70. Here, when performing the normal opening and closing operations of the steam valve unit 10, the first blocking electromagnetic valve V53a is in an excited state where the oil passage L1 is in an open state. In other words, at a normal time, the oil passage L1 is in a state where the working oil flows between the first hydraulic chamber C32a and the bidirectional pump 51. In contrast to the above, when performing the quick closing operation of the steam valve unit 10, the first blocking electromagnetic valve V53a becomes a non-excited state where the oil passage L1 is brought into a closed state. In other words, at an abnormal time, the flow of the working oil is blocked between the first hydraulic chamber C32a and the bidirectional pump 51.

The oil passage L2 (second opening degree controlling oil passage) in the hydraulic pressure circuit unit 50 has one end (right end) connected to the second pump port P51b of the bidirectional pump 51 and the other end (left end) connected to the second working oil port P32b of the cylinder 32. The oil passage L2 is provided with a branch part J4, a branch part J5, and a branch part J6 in sequence from the cylinder 32 side toward the bidirectional pump 51 side. Further, in the oil passage L2, a second blocking electromagnetic valve V53b is arranged between the cylinder 32 and the branch part J4.

The second blocking electromagnetic valve V53b operates based on the control signal outputted from the control device 70. Here, when performing the normal opening and closing operations of the steam valve unit 10, the second blocking electromagnetic valve V53b is in an excited state where the oil passage L2 is in an open state. In other words, at a normal time, the oil passage L2 is in a state where the working oil flows between the second hydraulic chamber C32b and the bidirectional pump 51. In contrast to the above, when performing the quick closing operation of the steam valve unit 10, the second blocking electromagnetic valve V53b becomes a non-excited state where the oil passage L2 is brought into a closed state. In other words, at an abnormal time, the flow of the working oil is blocked between the second hydraulic chamber C32b and the bidirectional pump 51.

In the hydraulic pressure circuit unit 50, each of the branch part J1 of the oil passage L1 and the branch part J4 of the oil passage L2 is connected with the oil passage L9 (first check valve installation oil passage). The oil passage L9 is provided such that a branch part J8 is sandwiched between a first check valve V54a and a second check valve V54b.

The first check valve V54a is arranged between the branch part J8 of the oil passage L9 and the branch part J1 of the oil passage L1. The first check valve V54a is arranged so that the working oil flows from the branch part J1 of the oil passage L1 toward the branch part J8 of the oil passage L9 but the working oil does not flow from the branch part J8 of the oil passage L9 toward the branch part J1 of the oil passage L1.

The second check valve V54b is arranged between the branch part J8 of the oil passage L9 and the branch part J4 of the oil passage L2. The second check valve V54b is arranged so that the working oil flows from the branch part J4 of the oil passage L2 toward the branch part J8 of the oil passage L9 but the working oil does not flow from the branch part J8 of the oil passage L9 toward the branch part J4 of the oil passage L2.

In the hydraulic pressure circuit unit 50, each of the branch part J2 of the oil passage L1 and the branch part J5 of the oil passage L2 is connected with the oil passage L10 (second check valve installation oil passage). The oil passage L10 is provided such that a branch part J9 is sandwiched between a third check valve V55a and a fourth check valve V55b.

The third check valve V55a is arranged between the branch part J9 of the oil passage L10 and the branch part J2 of the oil passage L1. The third check valve V55a is arranged so that the working oil flows from the branch part J2 of the oil passage L1 toward the branch part J9 of the oil passage L10 but the working oil does not flow from the branch part J9 of the oil passage L10 toward the branch part J2 of the oil passage L1.

The fourth check valve V55b is arranged between the branch part J9 of the oil passage L10 and the branch part J5 of the oil passage L2. The fourth check valve V55b is arranged so that the working oil flows from the branch part J5 of the oil passage L2 toward the branch part J9 of the oil passage L10 but the working oil does not flow from the branch part J9 of the oil passage L10 toward the branch part J5 of the oil passage L2.

In the hydraulic pressure circuit unit 50, each of the branch part J3 of the oil passage L1 and the branch part J6 of the oil passage L2 is connected with the oil passage L11 (pilot check valve installation oil passage). The oil passage L11 is provided such that a branch part J10 is sandwiched between a first pilot check valve V56a and a second pilot check valve V56b.

The first pilot check valve V56a is arranged between the branch part J10 of the oil passage L11 and the branch part J3 of the oil passage L1. The first pilot check valve V56a is configured such that a pilot port is connected with a portion communicating with the oil passage L2 and a reverse flow of the working oil is generated according to the hydraulic pressure applied to the pilot port. Here, the bidirectional pump 51 feeds the working oil to the second hydraulic chamber C32b via the oil passage L2, thereby allowing a free reverse flow at the first pilot check valve V56a when the hydraulic pressure is applied to the pilot port of the first pilot check valve V56a. In other words, at the first pilot check valve V56a, the working oil reversely flows from the branch part J3 side of the oil passage L1 toward the branch part J10 of the oil passage L11. In contrast to the above, when the bidirectional pump 51 does not feed the working oil to the second hydraulic chamber C32b via the oil passage L2, the working oil flows from the branch part J10 of the oil passage L11 toward the branch part J3 side of the oil passage L1 at the first pilot check valve V56a.

The second pilot check valve V56b is arranged between the branch part J10 of the oil passage L11 and the branch part J6 of the oil passage L2. The second pilot check valve V56b is configured such that a pilot port is connected with a portion communicating with the oil passage L1 and a reverse flow of the working oil is generated according to the hydraulic pressure applied to the pilot port. Here, the bidirectional pump 51 feeds the working oil to the first hydraulic chamber C32a via the oil passage L1, thereby allowing a free reverse flow at the second pilot check valve V56b when the hydraulic pressure is applied to the pilot port of the second pilot check valve V56b. In other words, at the second pilot check valve V56b, the working oil reversely flows from the branch part J6 side of the oil passage L2 toward the branch part J10 of the oil passage L11. In contrast to the above, when the bidirectional pump 51 does not feed the working oil to the first hydraulic chamber C32a via the oil passage L1, the working oil flows from the branch part J10 of the oil passage L11 toward the branch part J6 side of the oil passage L2 at the second pilot check valve V56b.

The branch part J10 of the oil passage L11 is connected to the reservoir 560 that stores the working oil, via the oil passage L12 (feeding oil passage).

The oil passage L3 (first quick closing oil passage) in the hydraulic pressure circuit unit 50 has one end connected to the third working oil port P32c of the cylinder 32 and the other end connected to the reservoir 560. In the oil passage L3, the first dump valve V52a is installed.

The first dump valve V52a is provided with an A port, a B port, and a pilot port and configured such that the A port and the B port are brought into a communication state or a block state according to the action of the working oil fed to the pilot port. When performing the normal opening and closing operations of the steam valve unit 10, the first dump valve V52a is closed with the A port and the B port being blocked from each other. In contrast to this, when performing the quick closing operation of the steam valve unit 10, the first dump valve V52a is opened with the A port and the B port being made to communicate with each other.

The oil passage L4 (second quick closing oil passage) in the hydraulic pressure circuit unit 50 has one end connected to the fourth working oil port P32d of the cylinder 32 and the other end connected to the branch part J8 of the oil passage L9. In the oil passage L4, the second dump valve V52b is installed.

The second dump valve V52b is provided with an A port, a B port, and a pilot port and configured such that the A port and the B port are brought into a communication state or a block state according to the action of the working oil fed to the pilot port. When performing the normal opening and closing operations of the steam valve unit 10, the second dump valve V52b is closed with the A port and the B port being blocked from each other. In contrast to this, when performing the quick closing operation of the steam valve unit 10, the second dump valve V52b is opened with the A port and the B port being made to communicate with each other.

In addition to the above, an accumulator 522 is coupled to a side closer to the branch part J8 of the oil passage L9 than the second dump valve V52b in the oil passage L4. The accumulator 522 is connected to the oil passage L4 via an accumulator oil passage LA connected to a feed/drain port at the bottom portion. The accumulator 522 accumulates the working oil therein and is charged with gas such as a nitrogen gas, and is configured to release the working oil to the outside by expansion of the gas. Further, a hydraulic pressure detector 523 is installed to measure the pressure (line pressure) in the accumulator oil passage LA coupling the accumulator 522 and the oil passage L4.

The oil passage L5 (first dump valve pilot oil passage) in the hydraulic pressure circuit unit 50 has one end connected to the pilot port of the first dump valve V52a. The oil passage L6 (second dump valve pilot oil passage) has one end connected to the pilot port of the second dump valve V52b. Both the other end of the oil passage L5 and the other end of the oil passage L6 are connected to a branch part J7 located at one end of the oil passage L7. The other end of the oil passage L7 is connected to the branch part J9 of the oil passage L10.

In the oil passage L7 in the hydraulic pressure circuit unit 50, a quick closing electromagnetic valve V524 is installed. Here, when performing the normal opening and closing operations of the steam valve unit 10, the quick closing electromagnetic valve V524 is in an excited state and opened with the A port and the B port being communicated with each other. In contrast to the above, when performing the quick closing operation of the steam valve unit 10, the quick closing electromagnetic valve V524 becomes a non-excited state with a T port and the A port being communicate with each other.

The oil passage L8 in the hydraulic pressure circuit unit 50 has one end connected to the T port of the quick closing electromagnetic valve V524 and the other end connected to the reservoir 560. The oil passage L7 is a first quick closing electromagnetic valve installation oil passage, and the oil passage L8 is a second quick closing electromagnetic valve installation oil passage.

The control device 70 includes an arithmetic unit (not illustrated) and a memory device (not illustrated), and the arithmetic unit performs an arithmetic operation using a program stored in the memory device to control the units. Into the control device 70, detection signals obtained by detecting the states of the units are inputted. In addition to this, for example, an operation command signal inputted by an operator into an operating device (not illustrated) is inputted into the control device 70. The control device 70 causes the hydraulic pressure circuit unit 50 to drive the hydraulic pressure drive unit 30 on the basis of the inputted various signals to thereby control the operation of the steam valve unit 10.

Hereinafter, a case of performing a normal opening operation (case 1), a case of performing a normal closing operation (case 2), a case of performing a quick closing operation (case 3), and a case of performing a release operation of the quick closing operation (case 4) of the above-described steam valve unit 10 will be described. Further, a case of performing a feed operation of feeding the working oil to the accumulator 522 (case 5) will be also described.

First, the case where the steam turbine valve drive apparatus 20 performs the normal opening operation of the above-described steam valve unit 10 (case 1) will be described (refer to the solid arrows illustrated in FIG. 1).

In the case of performing the normal opening operation, in the hydraulic pressure circuit unit 50, the control device 70 operates the servo motor 512 using the servo driver 514 to cause the bidirectional pump 51 to discharge the working oil from the first pump port P51a. In this event, the first blocking electromagnetic valve V53a is in an excited state where the working oil flows between the first hydraulic chamber C32a and the bidirectional pump 51 via the oil passage L1. Similarly, the second blocking electromagnetic valve V53b is in an excited state where the working oil flows between the second hydraulic chamber C32b and the bidirectional pump 51 via the oil passage L2.

Therefore, in the first hydraulic chamber C32a, the working oil discharged from the first pump port P51a of the bidirectional pump 51 flows into the first working oil port P32a. In contrast, in the second hydraulic chamber C32b, the working oil flows out from the second working oil port P32b to the second pump port P51b of the bidirectional pump 51. Thus, the piston 35 moves upward in the vertical direction z in the inner space C32 of the cylinder 32 under the influence of the steam power acting on the steam valve unit 10. As a result, in the steam valve unit 10, the valve element 15 moves upward to increase the distance between the valve seat 13 and the valve element 15, thereby increasing the opening degree.

Note that in the case of performing the normal opening operation, the quick closing electromagnetic valve V524 is in an excited state where the A port and the P port are communicated with each other. Therefore, the working oil discharged from the first pump port P51a of the bidirectional pump 51 passes through the branch part J2 of the oil passage L1, the branch part J9 of the oil passage L10, and the branch part J7 of the oil passage L7, and then branches off to the oil passage L5 and the oil passage L6 to act on the pilot port of the first dump valve V52a and the pilot port of the second dump valve V52b. Thus, each of the first dump valve V52a and the second dump valve V52b becomes a state where the A port and the B port are blocked from each other. As a result, the working oil accumulated as an emergency oil in the accumulator 522 does not flow into the fourth working oil port P32d of the second hydraulic chamber C32b via the second dump valve V52b of the oil passage L4. Further, the working oil does not flow out from the third working oil port P32c of the first hydraulic chamber C32a to the reservoir 560 via the first dump valve V52a of the oil passage L3.

Next, the case where the steam turbine valve drive apparatus 20 performs the normal closing operation of the above-described steam valve unit 10 (case 2) will be described (refer to the broken arrows illustrated in FIG. 1).

In the case of performing the normal closing operation, in the hydraulic pressure circuit unit 50, the control device 70 operates the servo motor 512 using the servo driver 514 to cause the bidirectional pump 51 to discharge the working oil from the second pump port P51b. In the case of performing the normal closing operation, the first blocking electromagnetic valve V53a and the second blocking electromagnetic valve V53b are in an excited state as in the case of performing the normal opening operation.

Therefore, in the second hydraulic chamber C32b, the working oil discharged from the second pump port P51b of the bidirectional pump 51 flows into the second working oil port P32b, whereas in the first hydraulic chamber C32a, the working oil flows out from the first working oil port P32a to the first pump port P51a of the bidirectional pump 51. Thus, the piston 35 moves downward in the vertical direction z in the inner space C32 of the cylinder 32 under the influence of the steam power acting on the steam valve unit 10. As a result, in the steam valve unit 10, the valve element 15 moves downward to decrease the distance between the valve seat 13 and the valve element 15, thereby decreasing the opening degree.

Note that in the case of performing the normal closing operation, the quick closing electromagnetic valve V524 is in an excited state where the A port and the P port are communicated with each other as in the case of performing the normal opening operation. Therefore, the working oil discharged from the second pump port P51b of the bidirectional pump 51 passes through the branch part J5 of the oil passage L2, the branch part J9 of the oil passage L10, and the branch part J7 of the oil passage L7, and then branches off to the oil passage L5 and the oil passage L6 to act on the pilot port of the first dump valve V52a and the pilot port of the second dump valve V52b. Thus, each of the first dump valve V52a and the second dump valve V52b becomes a state where the A port and the B port are blocked from each other. As a result, the working oil accumulated as an emergency oil in the accumulator 522 does not flow into the fourth working oil port P32d of the second hydraulic chamber C32b via the second dump valve V52b of the oil passage L4. Further, the working oil does not flow out from the third working oil port P32c of the first hydraulic chamber C32a to the reservoir 560 via the first dump valve V52a of the oil passage L3.

As described above, this embodiment is configured such that in each of the case of performing the normal opening operation and the case of performing the normal closing operation, the first dump valve V52a and the second dump valve V52b are brought into a closed state by the action of the working oil discharged from the bidirectional pump 51.

Figure 2:
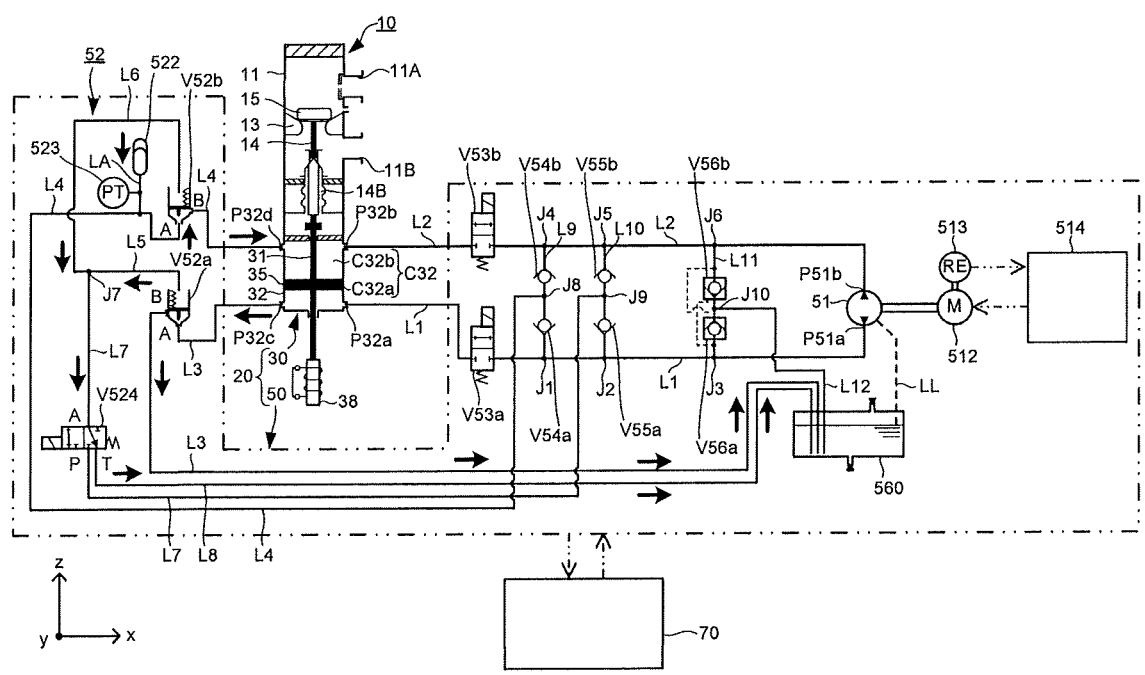
FIG. 2 is a diagram schematically illustrating an appearance in the case of performing a quick closing operation of the steam valve unit in the steam turbine generating station according to the first embodiment.

Next, the case where the steam turbine valve drive apparatus 20 performs the quick closing operation of the above-described steam valve unit 10 (case 3) will be described using FIG. 2. Specifically, the case of quickly closing the steam valve unit 10 at a speed higher than the speed of closing the steam valve unit 10 by the normal closing operation will be described. In FIG. 2, the appearance of the working oil when executing the quick closing operation is illustrated also with thick solid arrows.

The quick closing operation is executed by the control device 70 controlling the operations of the units constituting the quick closing mechanism 52 when abnormality occurs in the steam turbine generating station. Execution of the quick closing operation blocks the flow of steam to be fed as a working medium to the steam turbine to stop the steam turbine.

In the case of performing the quick closing operation, unlike the case of performing the normal closing operation, the quick closing electromagnetic valve V524 is changed from the excited state to the non-excited state on the basis of the control signal of the control device 70. In other words, the quick closing electromagnetic valve V524 is changed to a state where the A port and the P port are not communicated with each other but the A port and the T port are communicated with each other. Thus, the working oil from the pilot port of the first dump valve V52a flows through the oil passage L5 and the oil passage L7 in order, and then flows out from the T port of the quick closing electromagnetic valve V524 to the reservoir 560 via the oil passage L8. Similarly, the working oil from the pilot port of the second dump valve V52b flows through the oil passage L6 and the oil passage L7 in order, and then flows out from the T port of the quick closing electromagnetic valve V524 to the reservoir 560 via the oil passage L8. As a result, each of the first dump valve V52a and the second dump valve V52b becomes a state where the A port and the B port are communicated with each other, and both of the valves become an open state.

Accompanying the above, the working oil accumulated as an emergency oil in the accumulator 522 flows into the fourth working oil port P32d of the second hydraulic chamber C32b via the second dump valve V52b of the oil passage L4. Further, the working oil flows out from the third working oil port P32c of the first hydraulic chamber C32a to the reservoir 560 via the first dump valve V52a of the oil passage L3. Here, the speed of the working oil fed from the accumulator 522 to the second hydraulic chamber C32b is higher than the speed of the working oil fed from the bidirectional pump 51 to the second hydraulic chamber C32b. Thus, the piston 35 quickly moves downward in the vertical direction z in the inner space C32 of the cylinder 32. As a result, the steam valve unit 10 is quickly and entirely closed. After the steam valve unit 10 is entirely closed, the connection between the servo motor 512 and the servo driver 514 may be blocked according to the need to thereby change the servo driver 514 into a state of not controlling the rotation number of the servo motor 512.

As described above, in this embodiment, the quick closing mechanism 52 executes the quick closing operation of the steam valve unit 10 by feeding the working oil from the accumulator 522 to the second hydraulic chamber C32b and draining the working oil from the first hydraulic chamber C32a. In this embodiment, the quick closing operation is not performed using the spring force of a self-closing spring. Therefore, in this embodiment, the servo motor 512 driving the bidirectional pump 51 needs, when performing an operation of opening the steam valve unit 10, to have torque overcoming both of the steam power of the steam flowing through the steam valve unit 10 and the spring force of the self-closing spring. As a result, in this embodiment, the capacity of the servo motor 512 can be decreased.

Accordingly, in this embodiment, a reduction in size and in power consumption of the steam turbine valve drive apparatus can be easily achieved.

Note that in the case of performing the quick closing operation, in the hydraulic pressure circuit unit 50, the first blocking electromagnetic valve V53a is brought from the excited state to the non-excited state to block the oil passage L1 unlike the case of performing the normal closing operation. Together with this, the second blocking electromagnetic valve V53b is brought from the excited state to the non-excited state to block the oil passage L2. In other words, the hydraulic pressure circuit unit 50 is brought into a state where the working oil does not flow via the oil passage L1 between the first hydraulic chamber C32a and the first pump port P51a of the bidirectional pump 51 and the working oil does not flow via the oil passage L2 between the second hydraulic chamber C32b and the second pump port P51b of the bidirectional pump 51.

Therefore, in this embodiment, in the case of performing the quick closing operation, the working oil can be prevented from flowing from the first hydraulic chamber C32a and the second hydraulic chamber C32b to the bidirectional pump 51. As a result, in this embodiment, the rotation number can be prevented from exceeding an allowable rotation number in the bidirectional pump 51 and the servo motor 512.

Further, in this embodiment, the first check valve V54a and the second check valve V54b are installed in the oil passage L9 and can therefore prevent the working oil in the accumulator 522 from reversely flowing to the bidirectional pump 51 during the quick closing operation.

Figure 3:
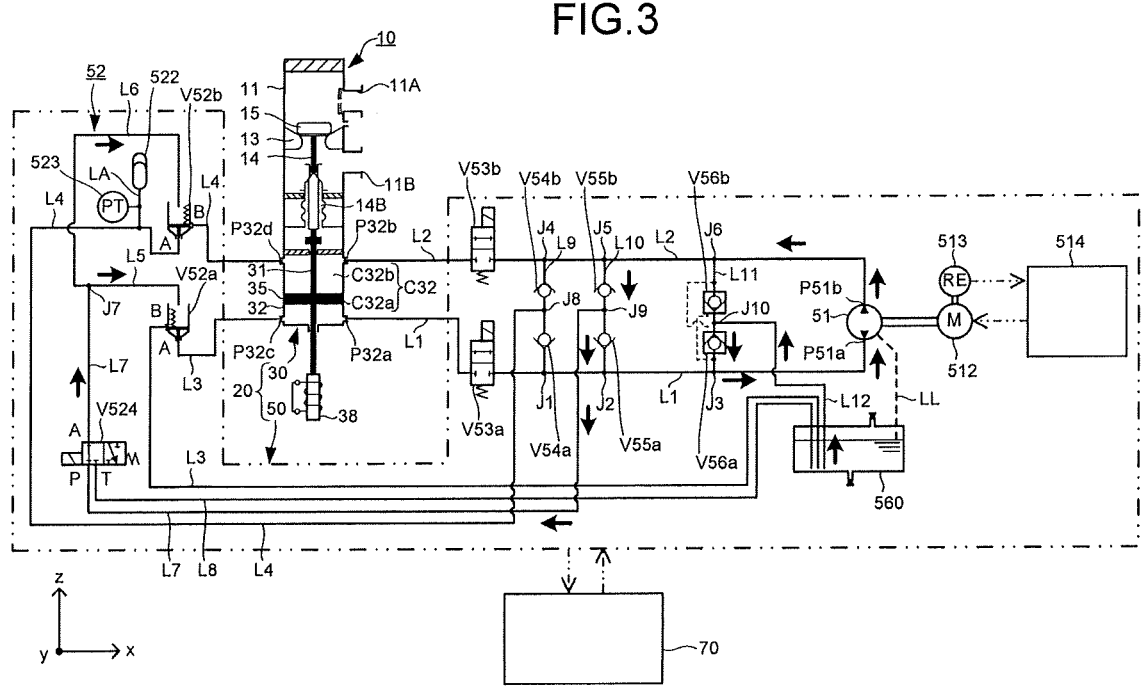
FIG. 3 is a diagram schematically illustrating an appearance in the case of performing release of the quick closing operation executed for the steam valve unit in the steam turbine generating station according to the first embodiment.

Next, the case where the steam turbine valve drive apparatus 20 performs the release operation of the quick closing operation of the above-described steam valve unit 10 (case 4) will be described using FIG. 3. In FIG. 3, the appearance of the working oil when performing the release operation of the quick closing operation is illustrated also with thick solid arrows.

The release operation of the quick closing operation is executed, when the steam turbine generating station is returned from the abnormal state to the normal state, to return the state of the steam valve unit 10 to a state capable of executing the normal opening and closing operations.

In the case of performing the release operation of the quick closing operation, the quick closing electromagnetic valve V524 is changed from the non-excited state to the excited state on the basis of the control signal of the control device 70. In other words, the quick closing electromagnetic valve V524 is changed to a state where the A port and the T port are not communicated with each other but the A port and the P port are communicated with each other. Thereafter, when the connection between the servo motor 512 and the servo driver 514 is released (servo OFF) in the quick closing operation, the servo motor 512 and the servo driver 514 can be connected with each other to change the servo driver 514 into a state capable of controlling the rotation number of the servo motor 512 (servo ON). In this event, the first blocking electromagnetic valve V53a and the second blocking electromagnetic valve V53b are kept in the non-excited state.

Then, for example, the servo motor 512 is driven to cause the bidirectional pump 51 to discharge the working oil in a direction of closing the steam valve unit 10. Thus, the working oil stored in the reservoir 560 flows into the branch part J10 of the oil passage L11 via the oil passage L12 and then flows through the first pilot check valve V56a. The working oil flowing through the first pilot check valve V56a then flows from the first pump port P51a to the second pump port P51b in the bidirectional pump 51 and is discharged.

Thereafter, in the oil passage L10, the working oil flows to the branch part J9 via the fourth check valve V55b. The working oil flowing to the branch part J9 then flows to the branch part J7 via the quick closing electromagnetic valve V524 in the oil passage L7. The working oil flowing to the branch part J7 flows to the pilot port of the first dump valve V52a via the oil passage L5 and flows to the pilot port of the second dump valve V52b via the oil passage L6. Thus, each of the first dump valve V52a and the second dump valve V52b becomes a state where the A port and the B port are blocked from each other, and both of the valves become a closed state.

As described above, in execution of the release operation of the quick closing operation, the quick closing electromagnetic valve V524 is changed from the non-excited state to the excited state to close the first dump valve V52a and the second dump valve V52b. Accompanying the above, the working oil is not fed any longer from the accumulator 522 to the second hydraulic chamber C32b. Further, the working oil does not flow out any longer from the first hydraulic chamber C32a to the reservoir 560.

As described above, after the release operation of the quick closing operation is performed, the first blocking electromagnetic valve V53a and the second blocking electromagnetic valve V53b are changed from the non-excited state to the excited state as illustrated in FIG. 1. For example, when the result of the pressure (line pressure) in the accumulator oil passage LA coupling the accumulator 522 and the oil passage L4 detected by the hydraulic pressure detector 523 is a prescribed value or more, the first blocking electromagnetic valve V53a and the second blocking electromagnetic valve V53b are changed to the excited state. In this manner, connecting the bidirectional pump 51 and the cylinder 32 with each other makes it possible to return the hydraulic pressure circuit unit 50 into a state capable of executing the normal opening and closing operations.

Note that driving of the bidirectional pump 51 is performed in a direction of closing the steam valve unit 10 so as to close the first dump valve V52a and the second dump valve V52b in the above, but is not limited to this. Driving of the bidirectional pump 51 may be performed in a direction of opening the steam valve unit 10 to thereby close the first dump valve V52a and the second dump valve V52b. Although not illustrated, in this case, the working oil stored in the reservoir 560 flows into the branch part J10 of the oil passage L11 via the oil passage L12, then passes through the second pilot check valve V56b, flows from the second pump port P51b to the first pump port P51a in the bidirectional pump 51, and is discharged. Thereafter, in the oil passage L10, the working oil flows to the branch part J9 via the third check valve V55a. Then, the working oil flows as in the above to bring both of the first dump valve V52a and the second dump valve V52b into a closed state. As described above, in this embodiment, even when the bidirectional pump 51 is operated in the direction of closing and the direction of opening the steam valve unit 10, the release operation of the quick closing operation can be executed.

Figure 4:
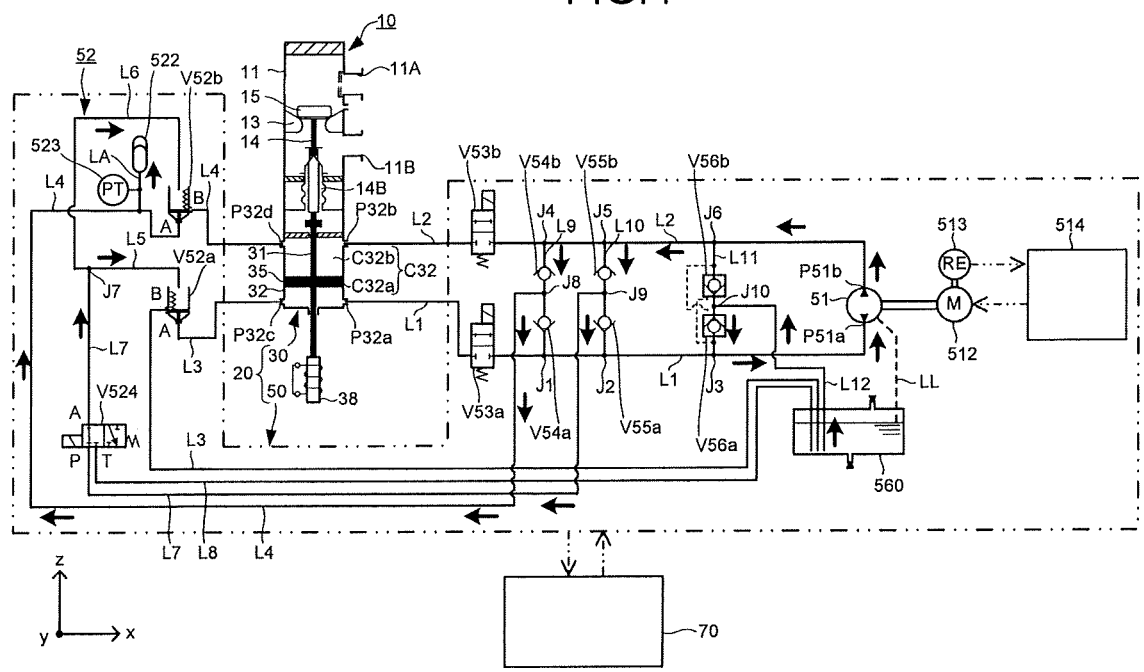
FIG. 4 is a diagram schematically illustrating an appearance in the case of performing a feed operation of feeding a working oil to an accumulator 522 in the steam turbine generating station according to the first embodiment.

Next, the case of executing the feed operation of feeding the working oil to the accumulator 522 (case 5) will be described using FIG. 4. In FIG. 4, the appearance of the working oil when executing the feed operation is illustrated also with thick solid arrows.

The feed operation is executed when the pressure detected by the hydraulic pressure detector 523 is less than the prescribed value. Execution of the feed operation brings the pressure detected by the hydraulic pressure detector 523 to the prescribed value or more, thereby returning the hydraulic pressure circuit unit 50 into a state capable of executing the quick closing operation.

In the case of executing the feed operation, the quick closing electromagnetic valve V524 is brought into the excited state and the first blocking electromagnetic valve V53a and the second blocking electromagnetic valve V53b are brought into the non-excited state. In other words, the quick closing electromagnetic valve V524 is brought into a state where the A port and the P port are communicated with each other and the working oil flows through the oil passage L7. The first blocking electromagnetic valve V53a is brought into a state where the working oil does not flow between the bidirectional pump 51 and the first hydraulic chamber C32a in the oil passage L1. The second blocking electromagnetic valve V53b is brought into a state where the working oil does not flow between the bidirectional pump 51 and the second hydraulic chamber C32b in the oil passage L2. Bringing the first blocking electromagnetic valve V53a and the second blocking electromagnetic valve V53b into the non-excited state to bring the bidirectional pump 51 and the cylinder 32 into an isolation state from each other, thereby preventing the piston 35 from moving in the cylinder 32.

Thereafter, for example, the servo motor 512 is driven to cause the bidirectional pump 51 to discharge the working oil in a direction of closing the steam valve unit 10. Thus, the working oil stored in the reservoir 560 flows into the branch part J10 of the oil passage L11 via the oil passage L12 and then flows through the first pilot check valve V56a. The working oil flowing through the first pilot check valve V56a flows from the first pump port P51a to the second pump port P51b in the bidirectional pump 51 and is discharged.

Accompanying the above, in the oil passage L10, the working oil flows to the branch part J9 via the fourth check valve V55b as in the case of the above-described "release of the quick closing operation", and then the working oil flowing to the branch part J9 flows to the branch part J7 via the quick closing electromagnetic valve V524 in the oil passage L7. The working oil flowing to the branch part J7 then flows to the pilot port of the first dump valve V52a via the oil passage L5 and flows to the pilot port of the second dump valve V52b via the oil passage L6. Thus, each of the first dump valve V52a and the second dump valve V52b becomes a state where the A port and the B port are blocked from each other, and both of the valves become a closed state.

Together with this, in the feed operation, the working oil flows to the branch part J8 via the second check valve V54b in the oil passage L9. The working oil flowing to the branch part J8 is then fed to the accumulator 522 via the oil passage L4. When the pressure detected by the hydraulic pressure detector 523 reaches the prescribed value by feeding the working oil to the accumulator 522, the feed operation is stopped. Thus, the hydraulic pressure circuit unit 50 can be returned to a state capable of executing the quick closing operation.

As described above, after the feed operation is stopped, the first blocking electromagnetic valve V53a and the second blocking electromagnetic valve V53b are changed from the non-excited state to the excited state as illustrated in FIG. 1. Thus, the hydraulic pressure circuit unit 50 can be returned to a state capable of executing the normal opening and closing operations.

Note that driving of the bidirectional pump 51 is performed in a direction of closing the steam valve unit 10 in the above feed operation, but is not limited to this. Driving of the bidirectional pump 51 may be performed in a direction of opening the steam valve unit 10 also in the feed operation as in the case of release of the quick closing operation. Although not illustrated, in this case, the working oil flows to the branch part J8 via the first check valve V54a in the oil passage L9, and is then fed to the accumulator 522 via the oil passage L4. As described above, in this embodiment, even when the bidirectional pump 51 is operated in a direction of closing and a direction of opening the steam valve unit 10, the feed operation can be executed.

Second Embodiment

Figure 5:
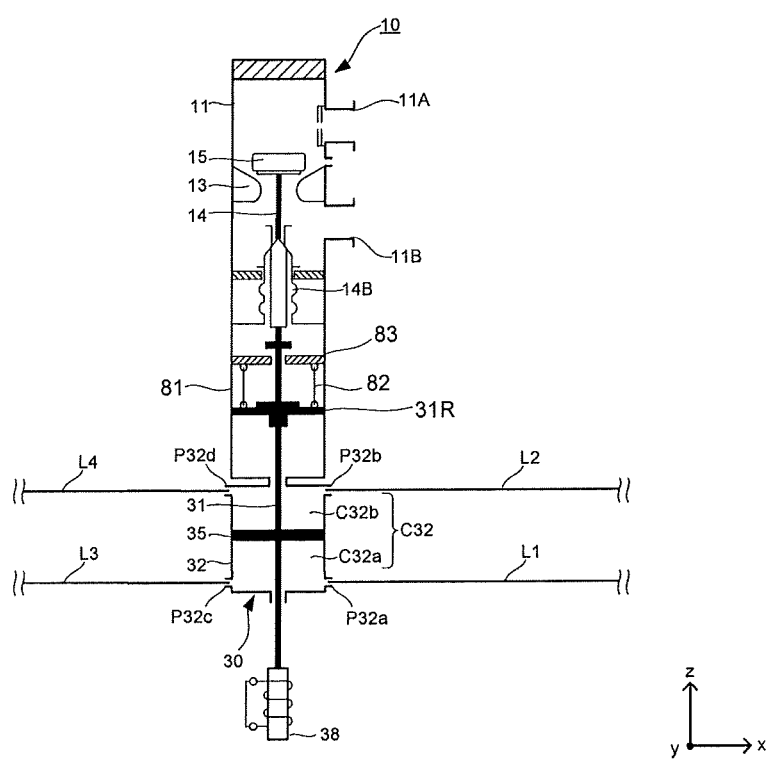
FIG. 5 is a diagram schematically illustrating essential parts of a steam turbine generating station according to a second embodiment.

A steam turbine generating station according to this embodiment will be described using FIG. 5. FIG. 5 illustrates a cross-section of a vertical plane (xz plane) along a vertical direction z, of a portion where a steam valve unit 10 and a hydraulic pressure drive unit 30 are provided. The illustration of a portion overlapping with that in FIG. 1 is appropriately omitted in FIG. 5.

As illustrated in FIG. 5, the hydraulic pressure drive unit 30 in this embodiment is provided with a closing spring 82. The closing spring 82 is, for example, a coil spring made by winding a metal wire in a spiral form, and housed in a spring box unit 81 installed between a valve box unit 11 and a cylinder 32 in the vertical direction z. The closing spring 82 is installed to penetrate through the inside of an operation rod 31 in the vertical direction z. The closing spring 82 is configured to expand and contract by the operation rod 31 operated by a piston 35.

Here, to the operation rod 31, a spring bearing 31R is fixed. Above the spring bearing 31R, a fixed plate 83 is fixed to an inner peripheral surface of the spring box unit 81. The closing spring 82 is interposed between the spring bearing 31R and the fixed plate 83, and is deformed in the vertical direction z along the axis of the operation rod 31 due to the change of the position of the spring bearing 31R accompanying the movement of the operation rod 31. The closing spring 82 presses the spring bearing 31R downward to thereby bias the operation rod 31 in a direction of closing the steam valve unit 10.

In this embodiment, the closing spring 82 does not have a large spring force required to execute the quick closing operation. The closing spring 82 has a small spring force at the level overcoming the frictional force between the valve rod 14 and a bush 14B and the frictional force between the piston 35 provided at the operation rod 31 and the cylinder 32. In other words, the hydraulic pressure drive unit 30 only needs to be configured such that when the working oil does not act on the piston 35 in an inner space C32 of the cylinder 32 and the piston 35 does not slide with the working oil, the piston 35 moves the valve element 15 to the valve seat 13 to bring the steam valve unit 10 into the entirely closed state with the spring force of the closing spring 82.

Therefore, in this embodiment, when the servo motor 512 is separated from the rotation number control at the stop of the steam turbine to create a state where the working oil does not act any longer on the piston 35 in the inner space C32 of the cylinder 32, the steam valve unit 10 can be brought into the entirely closed state with the spring force of the closing spring 82. Thereafter, when activating the steam turbine, the steam valve unit 10 can be kept in the entirely closed state until creating a state where steam is allowed to be fed as a working medium from a boiler to the steam turbine.

Accordingly, in this embodiment, the process of bringing the steam valve unit 10 into an entirely closed state does not need to be performed separately at the activation of the steam turbine, so that the activation of the steam turbine can be smoothly executed.

Third Embodiment

Figure 6:
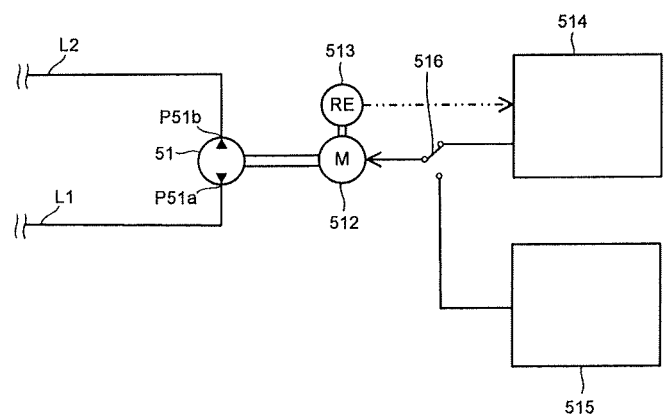
FIG. 6 is a diagram schematically illustrating essential parts of a steam turbine generating station according to a third embodiment.

A steam turbine generating station according to this embodiment will be described using FIG. 6. FIG. 6 illustrates a portion of a hydraulic pressure circuit unit 50 where a bidirectional pump 51, a servo motor 512, a resolver 513, and a servo driver 514 are provided. The illustration of a portion overlapping with that in FIG. 1 is appropriately omitted in FIG. 6.

As illustrated in FIG. 6, a dynamic brake device 515 and a switch 516 are further provided in this embodiment.

The dynamic brake device 515 is configured to short-circuit the wiring of the servo motor 512 to thereby generate a braking force.

The switch 516 performs switching to electrically connect the servo motor 512 to one of the servo driver 514 and the dynamic brake device 515.

Specifically, when an abnormality occurs in the servo driver 514 and the servo driver 514 becomes a state incapable of controlling the rotation number of the servo motor 512, the switch 516 is switched to electrically connect the servo motor 512 to the dynamic brake device 515 according to a signal (servo OFF signal) outputted from the servo driver 514. Thus, braking occurs in the servo motor 512.

When the rotation number control of the servo motor 512 is brought into a state separated from the servo driver 514, the working oil may flow from the cylinder 32 and an accumulator 522 into the bidirectional pump 51 (see FIG. 1). Therefore, the rotation number of the bidirectional pump 51 and the rotation number of the servo motor 512 may exceed allowable rotation numbers.

However, in this embodiment, when the rotation number control of the servo motor 512 is brought into a state separated from the servo driver 514, braking occurs in the servo motor 512 with the braking force by the dynamic brake device 515.

Accordingly, in this embodiment, it is possible to prevent the rotation number of the bidirectional pump 51 and the rotation number of the servo motor 512 from exceeding the allowable rotation numbers.

Fourth Embodiment

Figure 7:
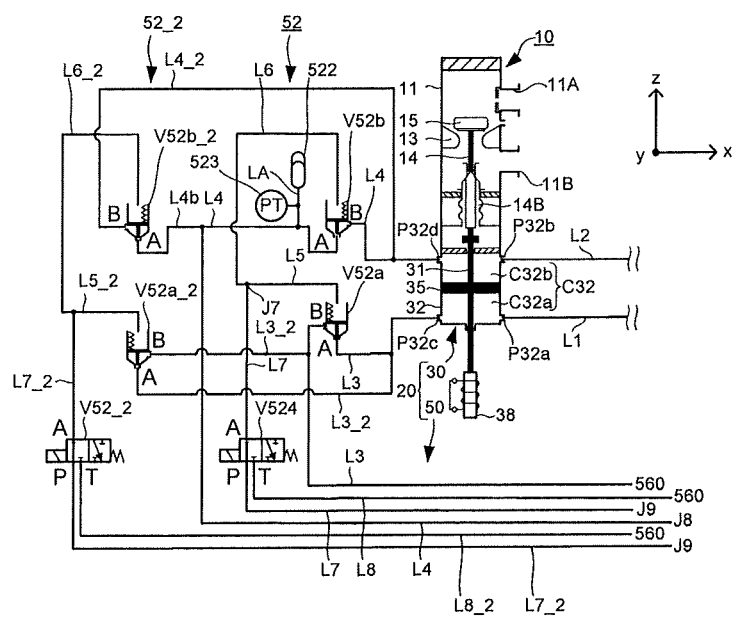
FIG. 7 is a diagram schematically illustrating essential parts of a steam turbine generating station according to a fourth embodiment.

A steam turbine generating station according to this embodiment will be described using FIG. 7. FIG. 7 illustrates a portion where a steam valve unit 10 and a hydraulic pressure drive unit 30 are provided and a portion where quick closing mechanisms 52, 52_2 of a hydraulic pressure circuit unit 50 are provided. The illustration of a portion overlapping with that in FIG. 1 is appropriately omitted in FIG. 7.

As illustrated in FIG. 7, two quick closing mechanisms 52, 52_2 are provided. In the hydraulic pressure circuit unit 50, the two quick closing mechanisms 52, 52_2 are installed in parallel with each other.

Specifically, one quick closing mechanism 52 is composed of a first dump valve V52a, a second dump valve V52b, and a quick closing electromagnetic valve V524. In contrast, the other quick closing mechanism 52_2 is composed of a first dump valve V52a_2, a second dump valve V52b_2, and a quick closing electromagnetic valve V524_2. The one quick closing mechanism 52 and the other quick closing mechanism 52_2 are configured similarly with each other.

In this embodiment, when executing the quick closing operation, the quick closing electromagnetic valve V524 in the one quick closing mechanism 52 is brought into a non-excited state. Thus, the working oil flows from a pilot port of the first dump valve V52a and through an oil passage L5 and an oil passage L7 in order, and then flows out from a T port of the quick closing electromagnetic valve V524 to a reservoir 560 via an oil passage L8. Similarly, the working oil flows from a pilot port of the second dump valve V52b and through an oil passage L6 and the oil passage L7 in order, and then flows out from the T port of the quick closing electromagnetic valve V524 to the reservoir 560 via an oil passage L8. As a result, each of the first dump valve V52a and the second dump valve V52b becomes an open state.

Together with this, the quick closing electromagnetic valve V524_2 in the other quick closing mechanism 52_2 is brought into a non-excited state. Thus, the working oil flows from a pilot port of the first dump valve V52a_2 and through an oil passage L5_2 and an oil passage L7_2 in order, and then flows out from a T port of the quick closing electromagnetic valve V524_2 to the reservoir 560 via an oil passage L8_2. Similarly, the working oil flows from a pilot port of the second dump valve V52b_2 and through an oil passage L6_2 and the oil passage L7_2 in order, and then flows out from the T port of the quick closing electromagnetic valve V524_2 to the reservoir 560 via an oil passage L8_2. As a result, each of the first dump valve V52a_2 and the second dump valve V52b_2 becomes an open state.

Accompanying the above, the working oil accumulated as an emergency oil in an accumulator 522 flows into a fourth working oil port P32d of a second hydraulic chamber C32b via the second dump valves V52b, V52b_2 of the oil passages L4, L4_2. Further, the working oil flows out from the a third working oil port P32c of a first hydraulic chamber C32a to the reservoir 560 via the first dump valves V52a, V52a_2 of the oil passages L3, L3_2. Thus, the piston 35 quickly moves downward in the vertical direction z in the inner space C32 of the cylinder 32. As a result, the steam valve unit 10 is quickly and entirely closed.

As described above, in this embodiment, the two quick closing mechanisms 52, 52_2 are provided. Therefore, even when an operation failure occurs in one of the two quick closing mechanisms 52, 52_2, the quick closing operation can be executed using the other of them. Accordingly, in this embodiment, the quick closing operation can be more surely executed, thereby enhancing the reliability.

Fifth Embodiment

Figure 8:
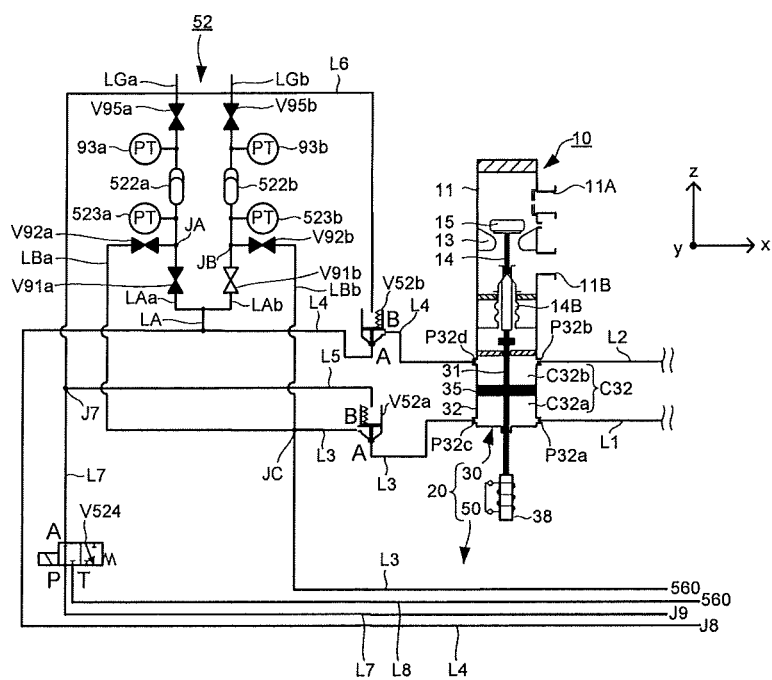
FIG. 8 is a diagram schematically illustrating essential parts of a steam turbine generating station according to a fifth embodiment.

A steam turbine generating station according to this embodiment will be described using FIG. 8. FIG. 8 illustrates a portion where a steam valve unit 10 and a hydraulic pressure drive unit 30 are provided and a portion where a quick closing mechanism 52 of a hydraulic pressure circuit unit 50 is provided. The illustration of a portion overlapping with that in FIG. 1 is appropriately omitted in FIG. 8.

As illustrated in FIG. 8, in this embodiment, two accumulator branch oil passages LAa, LAb branch off from an accumulator branch oil passage LA.

One accumulator branch oil passage LAa has one end (upper end) connected to an accumulator 522a and the other end (lower end) connected to the accumulator oil passage LA. The one accumulator branch oil passage LAa is provided with a branch part JA, and a hydraulic pressure detector 523a is installed between the one end and the branch part JA to detect a hydraulic pressure in the one accumulator branch oil passage LAa. Together with this, the one accumulator branch oil passage LAa is provided with a working oil blocking valve V91a between the other end and the branch part JA. A drain oil passage LBa is further provided in a manner to exist between the branch part JA of the one accumulator branch oil passage LAa and a branch part JC provided in an oil passage L3. The drain oil passage LBa is provided with a drain valve V92a.

FIG. 8 illustrates a case where the hydraulic pressure in the one accumulator branch oil passage LAa is a prescribed value or more. In this case, the working oil blocking valve V91a and the drain valve V92a are brought into a closed state as illustrated in FIG. 8.

The other accumulator branch oil passage LAb is configured as with the above-described one accumulator branch oil passage LAa. More specifically, the other accumulator branch oil passage LAb has one end connected to an accumulator 522b and the other end connected to the accumulator oil passage LA. The other accumulator branch oil passage LAb is provided with a branch part JB, and a hydraulic pressure detector 523b is installed between the one end and the branch part JB to detect a hydraulic pressure. Together with this, the other accumulator branch oil passage LAb is provided with a working oil blocking valve V91b between the other end and the branch part JB. A drain oil passage LBb is further provided in a manner to exist between the branch part JB of the other accumulator branch oil passage LAb and the branch part JC provided in the oil passage L3. The drain oil passage LBb is provided with a drain valve V92b. The above-described two accumulators 522a, 522b have responsibility divided for on-line and for stand-by. The accumulator for stand-by undergoes gas pressure monitoring and is charged with gas as necessary.

FIG. 8 illustrates a case where the hydraulic pressure in the other accumulator branch oil passage LAb is less than the prescribed value In this case, the working oil blocking valve V91b is opened with the drain valve V92a is closed. Then, the above-described feed operation is executed to feed the working oil to the accumulator 522b connected to the other accumulator oil passage LAb. Then, when the hydraulic pressure in the other accumulator oil passage LAb reaches the prescribed value, the feed operation is stopped.

The accumulator 522a installed in the one accumulator branch oil passage LAa is coupled with a gas flow passage LGa. The gas flow passage LGa is a gas charge line having one end connected to a gas supply source (not illustrated) and the other end connected to a gas supply port of the accumulator 522a. In the gas flow passage LGa, a gas shutoff valve V95a is installed, and a gas pressure detector 93a is installed between the other end and the gas shutoff valve V95a to detect the gas pressure in the gas flow passage LGa.

Similarly, the accumulator 522b in the other accumulator branch oil passage LAb is coupled with a gas flow passage LGb. The gas flow passage LGb is a gas charge line having one end connected to the gas supply source and the other end connected to a gas supply port of the accumulator 522b. In the gas flow passage LGb, a gas shutoff valve V95b is installed, and a gas pressure detector 93b is installed between the other end and the gas shutoff valve V95b to detect the gas pressure in the gas flow passage LGb.

FIG. 8 illustrates a case where the gas pressure in the one gas flow passage LGa and the gas pressure in the other gas flow passage LGb are a prescribed value or more. In this case, the one gas shutoff valve V95a and the other gas shutoff valve V95b are brought into a closed state.

Although not illustrated, when the gas pressure in the one gas flow passage LGa is less than the prescribed value, the one gas shutoff valve V95a is opened to charge the one accumulator 522a with gas such as a nitrogen gas. The operation of charging the one accumulator 522a with the gas is executed with the working oil blocking valve V91a closed. The drain valve V92a is opened during the charging with the gas and closed after completion of the charging with the gas. Similarly, when the gas pressure in the other gas flow passage LGb is less than the prescribed value, the other gas shutoff valve V95b is opened to charge the other accumulator 522b with gas such as a nitrogen gas. The operation of charging the other accumulator 522b with the gas is executed with the working oil blocking valve V91b closed. The drain valve V92b is opened during the charging with the gas and closed after completion of the charging with the gas.

As described above, in this embodiment, the accumulators 522a, 522b can be charged with the gas such as a nitrogen gas, so that the pressure of the gas with which the accumulators 522a, 522b are charged can be kept at the prescribed value. Accordingly, in this embodiment, the quick closing operation can be more surely executed, thereby enhancing the reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A steam turbine valve drive apparatus comprising:
   a piston provided at an operation rod that operates a steam valve installed in a flow passage for steam flowing to a steam turbine;
   a cylinder housing the piston in an inner space thereof, the inner space being partitioned by the piston into a first hydraulic chamber and a second hydraulic chamber;
   a bidirectional pump configured to execute an opening operation of the steam valve by feeding a working oil to the first hydraulic chamber and configured to execute a closing operation of the steam valve by feeding the working oil to the second hydraulic chamber;
   a servo motor configured to drive the bidirectional pump; and
   a quick closing mechanism configured to execute a quick closing operation of closing the steam valve more quickly than the closing operation,
   wherein the quick closing mechanism includes:
      a first dump valve arranged in a first quick closing oil passage configured to connect to the first hydraulic chamber,
      a second dump valve arranged in a second quick closing oil passage configured to connect to the second hydraulic chamber,
      a quick closing electromagnetic valve configured to open the first dump valve and the second dump valve during execution of the quick closing operation,
      a first blocking electromagnetic valve arranged in a first opening degree controlling oil passage connecting between the bidirectional pump and the first hydraulic chamber, which is configured to block the first opening degree controlling oil passage during the execution of the quick closing operation, and
      a second blocking electromagnetic valve arranged in a second opening degree controlling oil passage connecting between the bidirectional pump and the second hydraulic chamber, Which is configured to block the second opening degree controlling oil passage during the execution of the quick closing operation, wherein
   by executing the quick closing operation, the quick closing mechanism is configured to feed the working oil accumulated in an accumulator to the second hydraulic chamber and configured to drain the working oil from the first hydraulic chamber to a reservoir.

2. The steam turbine valve drive apparatus according to claim 1, wherein
   the quick closing mechanism is configured to execute a release operation in which the quick closing electromagnetic valve is changed from a non-excited state to an excited state to cause the bidirectional pump to feed the working oil from the reservoir to a pilot port of the first dump valve and a pilot port of the second dump valve via the quick closing electromagnetic valve to thereby close the first dump valve and the second dump valve.

3. The steam turbine valve drive apparatus according to claim 2, configured such that the working oil discharged from the bidirectional pump flows into the quick closing electromagnetic valve via a check valve.

4. The steam turbine valve drive apparatus according to claim 3, configured such that the working oil stored in the reservoir flows into the bidirectional pump via a pilot check valve.

5. The steam turbine valve drive apparatus according to claim 2, configured such that the working oil stored in the reservoir flows into the bidirectional pump via a pilot check valve.

6. The steam turbine valve drive apparatus according to claim 1, wherein
   the quick closing mechanism is configured to execute a feed operation in which the bidirectional pump feeds the working oil from the reservoir to the accumulator with the quick closing electromagnetic valve being in an excited state and the first dump valve and the second dump valve closed.

7. The steam turbine valve drive apparatus according to claim 6, further comprising:
   a hydraulic pressure detector configured to detect a hydraulic pressure of the working oil accumulated in the accumulator, wherein
   the quick closing mechanism is configured to execute the feed operation when the hydraulic pressure detected by the hydraulic pressure detector is less than a prescribed value.

8. The steam turbine valve drive apparatus according to claim 7, configured such that the working oil stored in the reservoir flows into the bidirectional pump via a pilot check valve.

9. The steam turbine valve drive apparatus according to claim 6, configured such that the working oil discharged from the bidirectional pump flows into the accumulator via a check valve.

10. The steam turbine valve drive apparatus according to claim 9, configured such that the working oil stored in the reservoir flows into the bidirectional pump via a pilot check valve.

11. The steam turbine valve drive apparatus according to claim 6, configured such that the working oil stored in the reservoir flows into the bidirectional pump via a pilot check valve.

12. The steam turbine valve drive apparatus according to claim 1, further comprising:
   a closing spring configured to bias the operation rod in a direction of closing the steam valve.

13. The steam turbine valve drive apparatus according to claim 1, further comprising:
   a controller;
   a dynamic brake device; and
   a switch configured to switch to electrically connect the servo motor to one of a servo driver and the dynamic brake device, wherein
   when the controller detects that an abnormality has occurred in the servo driver, the controller controls the switch to perform the switching to electrically connect the servo motor to the dynamic brake device to cause the dynamic brake device to stop an operation of the servo motor.

14. The steam turbine valve drive apparatus according to claim 1, further comprising:
   a controller; and
   a gas pressure detector;
   wherein:
   the accumulator is configured to be charged with gas and configured to release the working oil to an outside by expansion of the gas;
   the gas pressure detector is configured to detect pressure of the gas with which the accumulator is charged; and
   when the pressure detected by the gas pressure detector is less than a prescribed value, the controller controls the accumulator to be charged with the gas.

\* \* \* \* \*